(12) United States Patent
Chen et al.

(10) Patent No.: US 10,585,273 B2
(45) Date of Patent: Mar. 10, 2020

(54) TWO PASS MACRO IMAGE

(71) Applicant: Leica Biosystems Imaging, Inc., Vista, CA (US)

(72) Inventors: Leng-Chun Chen, Vista, CA (US); Yunlu Zou, San Diego, CA (US); Allen Olson, San Diego, CA (US); Peyman Najmabadi, San Diego, CA (US); Greg Crandall, San Marcos, CA (US); Nicholas Newberg, San Marcos, CA (US); Aaron Stearrett, Port Orchard, WA (US)

(73) Assignee: LEICA BIOSYSTEMS IMAGING, INC., Vista, CA (US)

( * ) Notice: Subject to any disclaimer, the term of this patent is extended or adjusted under 35 U.S.C. 154(b) by 0 days.

(21) Appl. No.: 16/146,991

(22) Filed: Sep. 28, 2018

(65) Prior Publication Data

US 2019/0101736 A1  Apr. 4, 2019

Related U.S. Application Data

(60) Provisional application No. 62/566,165, filed on Sep. 29, 2017.

(51) Int. Cl.
*G02B 21/00* (2006.01)
*H04N 5/369* (2011.01)
(Continued)

(52) U.S. Cl.
CPC ....... *G02B 21/008* (2013.01); *G02B 21/0032* (2013.01); *G02B 21/0072* (2013.01);
(Continued)

(58) Field of Classification Search
CPC ..................................................... G02B 21/34
See application file for complete search history.

(56) References Cited

U.S. PATENT DOCUMENTS

| 7,558,415 B2 | 7/2009 | McLaren et al. |
| 7,570,359 B2 | 8/2009 | Fox |

(Continued)

OTHER PUBLICATIONS

International Search Report and Written Opinion dated Dec. 4, 2018 for related International Application No. PCT/US2018/053632, in 12 pages.

*Primary Examiner* — Paulos M Natnael
(74) *Attorney, Agent, or Firm* — Procopio, Cory, Hargreaves & Savitch LLP

(57) ABSTRACT

Two-pass capture of a macro image. In an embodiment, a scanning apparatus comprises a stage, a high-resolution camera, and a lens that provides a field of view, substantially equal in width to a slide width, to the high-resolution camera. The apparatus also comprises a first illumination system for transmission-mode illumination, and a second illumination system for reflection-mode illumination. Processor(s) move the stage in a first direction to capture a first macro image of a specimen during a single pass while the field of view is illuminated by the first illumination system, and move the stage in a second direction to capture a second macro image of the specimen during a single pass while the field of view is illuminated by the second illumination system. The processor(s) identify artifacts in the second macro image, and, based on those artifacts, correct the first macro image to generate a modified first macro image.

15 Claims, 5 Drawing Sheets

(51) Int. Cl.
*H04N 5/217* (2011.01)
*H04N 5/225* (2006.01)

(52) U.S. Cl.
CPC .......... *H04N 5/217* (2013.01); *H04N 5/2171* (2013.01); *H04N 5/2256* (2013.01); *H04N 5/3692* (2013.01)

(56) References Cited

U.S. PATENT DOCUMENTS

| | | |
|---|---|---|
| 7,761,241 B2 | 7/2010 | Corson |
| 7,978,898 B2 | 7/2011 | Uchiyama et al. |
| 8,164,829 B2 | 4/2012 | Ganser |
| 2007/0147673 A1 | 6/2007 | Crandall |
| 2011/0115897 A1 | 5/2011 | Najmabadi et al. |
| 2012/0092477 A1 | 4/2012 | Kawano et al. |
| 2012/0099852 A1 | 4/2012 | Staker et al. |
| 2014/0204196 A1* | 7/2014 | Loney ............ G02B 7/38 348/80 |
| 2015/0109512 A1 | 4/2015 | Oishi |
| 2015/0130920 A1 | 5/2015 | Zou et al. |
| 2018/0188517 A1* | 7/2018 | Zou ............ G02B 21/002 |

* cited by examiner

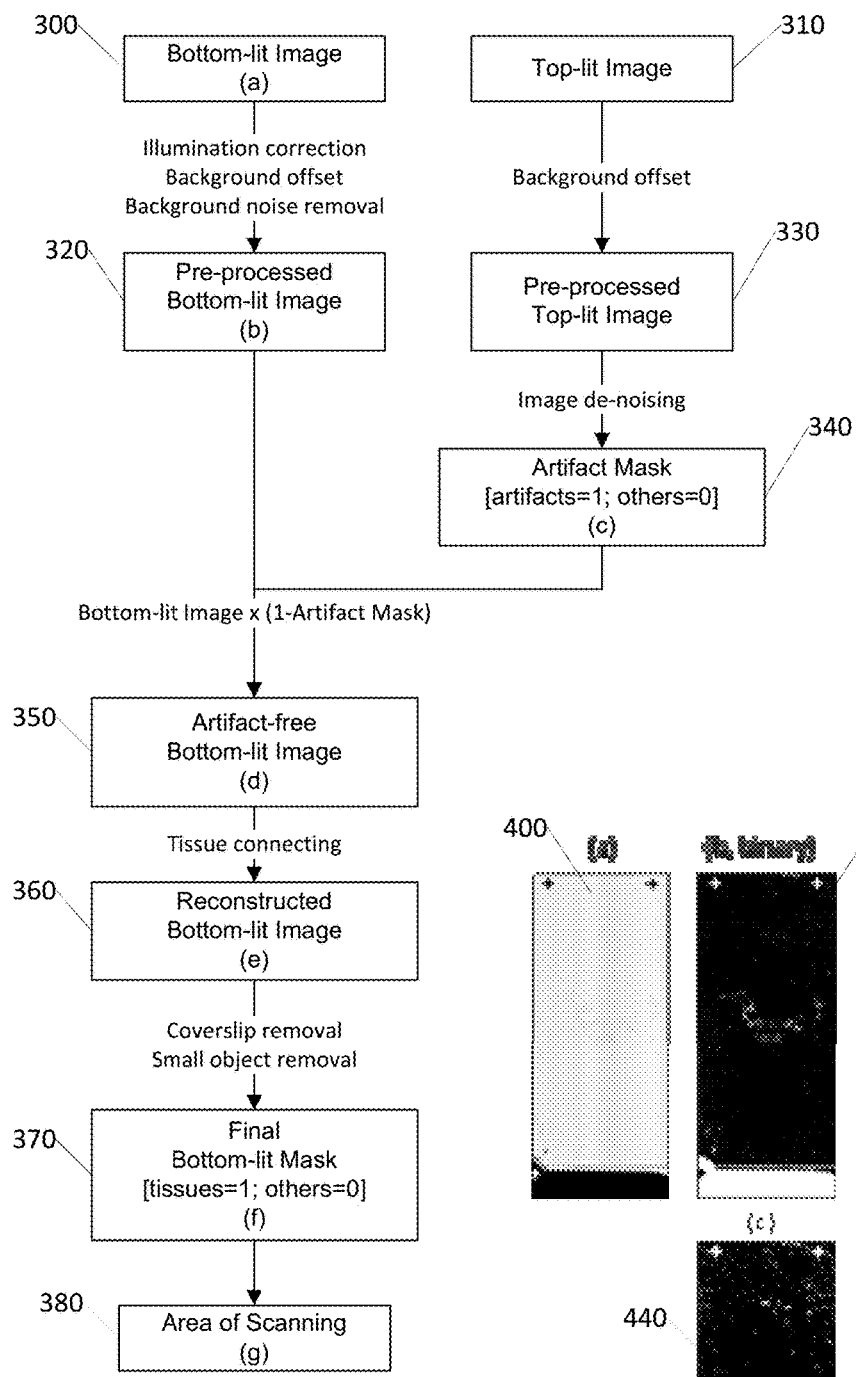
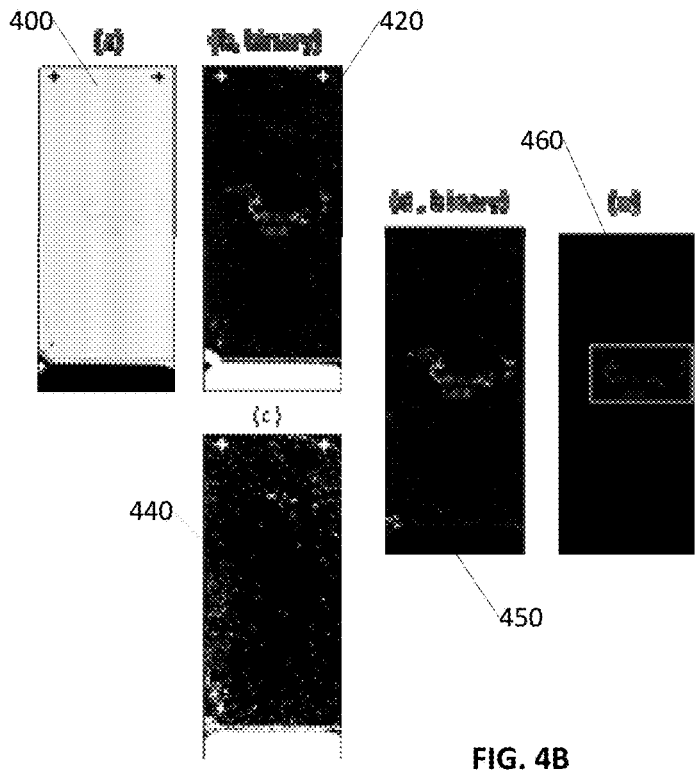
FIG. 4A
FIG. 4B

TWO PASS MACRO IMAGE

CROSS-REFERENCE TO RELATED APPLICATIONS

The present application claims priority to U.S. Provisional Patent App. No. 62/566,165, filed on Sep. 29, 2017, which is hereby incorporated herein by reference, as if set forth in full.

BACKGROUND

Field of the Invention

The present disclosure generally relates to digital pathology, and more particularly relates to identifying a tissue area on a glass slide using a digital slide scanning apparatus.

Related Art

Digital pathology is an image-based information environment which is enabled by computer technology that allows for the management of information generated from a physical slide. Digital pathology is enabled in part by virtual microscopy, which is the practice of scanning a specimen on a physical glass slide and creating a digital slide image that can be stored, viewed, managed, and analyzed on a computer monitor. With the capability of imaging an entire glass slide, the field of digital pathology has exploded and is currently regarded as one of the most promising avenues of diagnostic medicine in order to achieve even better, faster, and cheaper diagnosis, prognosis, and prediction of important diseases, such as cancer.

A conventional digital slide scanning apparatus typically includes a high-resolution camera sensor that is used for scanning a high-resolution image of the specimen on the slide. A conventional digital slide scanning apparatus also typically includes a low-resolution camera sensor that is used for scanning a low-resolution macro image of the specimen on the slide. Typically, the macro image is used to identify the area of the glass slide that is occupied by the specimen, and may also be used to generate a thumbnail image of the whole slide. A drawback of the conventional digital slide scanning apparatus is that the inclusion of the low-resolution camera sensor adds cost to the apparatus. One solution that has been proposed is to use the high-resolution camera sensor to capture a high-resolution macro image.

However, a disadvantage of having a high-resolution macro image obtained by the high-resolution camera is that the high-resolution macro image often includes unwanted image artifacts from physical items on the slide or slide cover slip, such as dust, fingerprints, and/or the like. These artifacts can be introduced during slide preparation or handling.

These unwanted image artifacts in the macro image can significantly impact the image processing that is performed on the macro image of the specimen to determine, for example, the location of the specimen, the area of the glass slide to be scanned, and an initial focus point on the specimen. Furthermore, if an initial focus point (e.g., for constructing a focal surface) happens to be set to a location of an unwanted image artifact, the quality of the resulting digital slide image can be negatively impacted. Therefore, what is needed is a system and method that overcomes these significant problems found in the conventional systems as described above.

SUMMARY

To solve the problems associated with conventional macro image capture in a digital slide scanning apparatus, solutions are described herein that utilize first and second illumination systems to capture two images of the slide. In an embodiment, a first image is captured using a transmission-illumination system (from below the slide) and processed for illumination correction and, perhaps, other image enhancements. A second image may be captured using a reflection-illumination system (from above the slide) and processed to identify unwanted image artifacts. The identified image artifacts from the second image can then be removed from the first image, and the corrected first image may be stored as the macro image.

In an embodiment of the macro image acquisition process, the stage travels a linear out-and-back path to move the glass slide all the way out to the macro image location and then back to the scanning location. On the "out" portion of the trip, the macro image is captured using transmission mode illumination and the lens corresponding to the macro image optical path. On the "back" portion of the trip, a second macro image is captured using reflection mode illumination and the lens corresponding to the macro image optical path. Thus, a second, oblique illumination source is included in the scanning apparatus and positioned for use with the macro image optical path. The second illumination source provides illumination from the top of the glass slide and uses an angled scatter light to highlight only the artifacts on the glass slide and/or coverslip without reflecting any light onto the camera sensor in the optical path. A processor in the scanning apparatus processes the two whole slide images captured during the "out" and "back" portions of the trip under the macro image optical path, and the image processing removes the artifacts, identified in the second image, from the first image. The modified first image is thereafter employed as a clean macro image for use in tissue finding and initial focus point selection.

The embodiments described herein provide significant advantages over conventional solutions. One advantage is that high-resolution cameras produce macro slide images with fine details. However, macro images that are scanned using transmission mode illumination include both the specimen as well as unwanted image artifacts on the glass slide and/or cover slip. Advantageously, top-illuminated macro images clearly show the unwanted image artifacts from items such as fingerprints, dust, hair, sealant, valap (vasoline, lanolin, paraffin), white paint labels, and/or the like (collectively referred to herein as "debris") that are frequently present on glass slides or coverslips. Accordingly, image processing of the two macro images (one captured with bottom illumination and one captured with top illumination) allows for the removal of unwanted image artifacts from the macro image captured with bottom illumination to result in a high-resolution macro image without unwanted image artifacts. The present embodiments prevent the need to include extra areas for high-resolution scanning. The present embodiments also perform heavy image de-noising on the macro image, captured with top illumination, while performing very little image processing on the macro image captured with bottom illumination, which reduces the risk of mis-identifying specimen areas on the glass slide.

In an embodiment, a digital slide scanning apparatus is disclosed comprising: a high resolution camera having a field of view; a first lens in a macro image optical path, the first lens configured to provide a field of view of the high resolution camera with an image of a substantially complete width of a glass slide; a first illumination system optically coupled with the first lens and configured for transmission mode Illumination; a second illumination system optically coupled with the first lens and configured for reflection mode Illumination and further configured to angle the illumination light in a pattern such that substantially no second illumination system light is reflected into the field of view of the high resolution camera; a processor configured to move a stage supporting the glass slide in a first direction and to capture a first macro image of a specimen on the glass slide using the high resolution camera, the first lens and the first illumination system during a single pass of the glass slide under the first lens; wherein the processor further configured to move the stage in a second direction, opposite the first direction, to capture a second macro image of a specimen on the glass slide using the high resolution camera, the first lens and the second illumination system during a single pass of the glass slide under the first lens; wherein the processor is further configured to identify unwanted image artifacts in the second macro image and correct the first macro image to generate a modified first macro image in accordance with the identified unwanted image artifacts. The processor may be further configured to use the modified first macro image in tissue finding and initial focus point selection. The first illumination system may further comprise a diffuser.

In an embodiment, a method is disclosed comprising: turning on a first illumination system configured for transmission mode Illumination, the first illumination system optically coupled with a lens and a high resolution camera having a field of view, wherein the lens and the high resolution camera define an optical path; moving a stage supporting a glass slide in a first direction with respect to the optical path and during said movement, capturing a first macro image of a specimen on the glass slide using the high resolution camera, the lens and the first illumination system; turning off the first illumination system; subsequent to turning off the first illumination system, turning on a second illumination system configured for reflection mode Illumination, the second illumination system optically coupled with the lens and the high resolution camera; moving the stage supporting the glass slide in a second direction, opposite the first direction, and during said movement, capturing a second macro image of a specimen on the glass slide using the high resolution camera, the lens and the second illumination system; identifying one or more unwanted image artifacts in the second macro image; correcting the first macro image to generate a modified first macro image in accordance with the identified unwanted image artifacts.

In an embodiment, a method is disclosed comprising: turning on a reflection mode illumination system configured for reflection mode Illumination, the reflection mode illumination system optically coupled with a lens and a high resolution camera having a field of view, wherein the lens and the high resolution camera define an optical path; moving a stage supporting a glass slide in a first direction with respect to the optical path and during said movement, capturing a reflection mode macro image of a specimen on the glass slide using the high resolution camera, the lens and the first illumination system; turning off the reflection mode illumination system; subsequent to turning off the reflection mode illumination system, turning on a transmission mode illumination system configured for transmission mode Illumination, the transmission mode illumination system optically coupled with the lens and the high resolution camera; moving the stage supporting the glass slide in a second direction, opposite the first direction, and during said movement, capturing a transmission mode macro image of the specimen on the glass slide using the high resolution camera, the lens and the transmission mode illumination system; identifying one or more unwanted image artifacts in the reflection mode macro image; correcting the transmission mode macro image to generate a modified transmission mode macro image in accordance with the identified unwanted image artifacts.

In an embodiment, a method is disclosed comprising: turning on a reflection mode illumination system configured for reflection mode Illumination, the reflection mode illumination system optically coupled with a lens and a high resolution camera having a field of view, wherein the lens and the high resolution camera define an optical path; moving a stage supporting a glass slide in a first direction with respect to the optical path and during said movement, capturing a reflection mode macro image of a specimen on the glass slide using the high resolution camera, the lens and the first illumination system; turning on a transmission mode illumination system configured for transmission mode Illumination, the transmission mode illumination system optically coupled with the lens and the high resolution camera; moving the stage supporting the glass slide in a second direction, opposite the first direction, and during said movement, capturing a transmission mode macro image of the specimen on the glass slide using the high resolution camera, the lens and the transmission mode illumination system; identifying one or more unwanted image artifacts in the reflection mode macro image; correcting the transmission mode macro image to generate a modified transmission mode macro image in accordance with the identified unwanted image artifacts.

In an embodiment, a method is disclosed comprising: capturing a first macro image of a specimen on a glass slide using a high resolution camera, a lens and a first illumination system; capturing a second macro image of the specimen on the glass slide using the high resolution camera, the lens and a second illumination system; analyzing the second macro image to identify unwanted image artifacts; and correcting the first macro image to generate a modified first macro image in accordance with the identified unwanted image artifacts. The first illumination system may be configured for transmission-mode illumination. The second illumination system may be configured for reflection-mode illumination.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which:

FIG. 4A is a flow diagram illustrating an example process for determining a scan area for a glass slide having a sample thereon, according to an embodiment;

FIG. 4B is a block diagram illustrating an example set of images used to determine a scan area for a glass slide having a sample thereon, according to an embodiment;

DETAILED DESCRIPTION

Certain embodiments disclosed herein provide systems and methods for capturing a high-resolution macro image of a glass slide that is free from unwanted image artifacts. For example, one method disclosed herein allows for a first high-resolution macro image to be captured using a bottom-illumination system and a second high-resolution macro image to be captured using a top-illumination system. The two high-resolution macro images are processed to identify unwanted image artifacts in the second high-resolution macro image and remove the identified unwanted image artifacts from the first high-resolution macro image to produce a high-resolution macro image with no unwanted image artifacts. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1A:
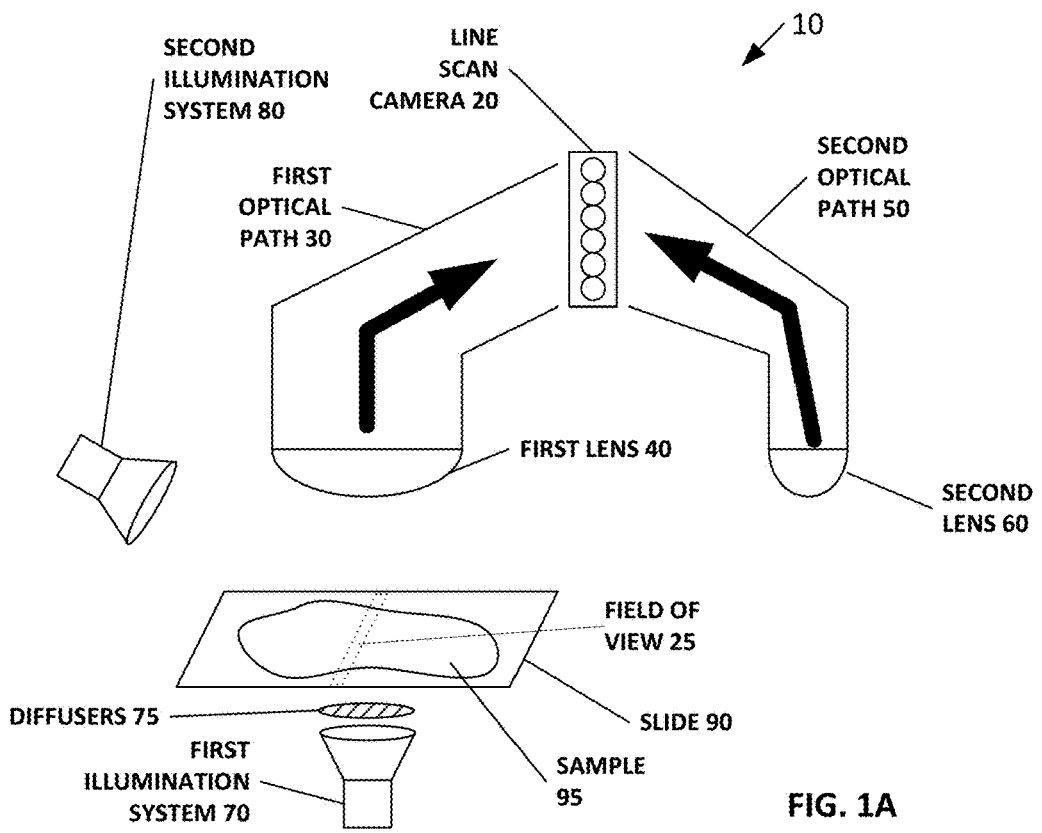
FIG. 1A is a block diagram illustrating an example digital slide scanning system for identifying a tissue area of a glass slide, according to an embodiment.

FIG. 1A is a block diagram illustrating an example digital slide scanning apparatus 10 for identifying a tissue area of a sample 95 on a glass slide 90, according to an embodiment. In the illustrated embodiment, the scanning apparatus 10 includes a high-resolution camera 20 that defines a first optical path 30 in combination with a first lens 40. The first optical path 30 is configured for capturing high-resolution macro images of the sample 95 on the slide 90. The first optical path 30 fully encompasses a field of view 25 of the high-resolution camera 20 on the sample 95. The combination of the high-resolution camera 20 and the first lens 40 with the first optical path 30 is such that the field of view 25 covers substantially the entire width of the slide 90, such that a single pass of the slide 90 under the first optical path 30 allows for imaging of the entire slide 90. A macro image is typically captured at low magnification and includes the entire slide 90 in the macro image. The high-resolution camera 20 also defines a second optical path 50 in combination with a second lens 60. The second optical path 50 is for capturing high-resolution images at high magnification.

In an embodiment, the high-resolution camera can be a line scan camera or an area scan camera or any of a variety of high-resolution cameras such as a time delay integration (TDI) camera, a color camera, or the like. For ease of discussion, the high-resolution camera will be referred to herein as a line scan camera 20.

The digital slide scanning apparatus 10 also includes a first illumination system 70 that may optionally include one or more diffusers 75. The first illumination system 70 is positioned below the slide 90 and is configured for transmission-mode illumination, such that light from the first illumination system 70 passes through the sample 95 and into the first optical path 30. The light from the first illumination system 70 may also pass through the one or more diffusers 75 prior to passing through the sample 95. Advantageously, the one or more diffusers 75 function to provide uniform illumination in the first optical path 30.

The digital slide scanning apparatus 10 also includes a second illumination system 80. The second illumination system 80 is positioned above the slide 90 and is configured for reflection-mode illumination, such that substantially all light from the second illumination system 80 reflects off of the slide 90 and the sample 95 and away from the first optical path 30. Advantageously, the desired reflected light from debris will pass into the first optical path 30. However, some undesired reflected light may also pass into the first optical path 30. Accordingly, the digital slide scanning apparatus 10 is configured such that undesired reflected light from the second illumination system 80 does not land on any individual pixel sensor of the high-resolution camera 20.

In an embodiment, during the macro image acquisition process, the stage (not shown) travels a linear out-and-back path (e.g., along an X axis that is parallel to the longitudinal axis of slide 90). The out-and-back path moves the glass slide 90 under a macro imaging position, defined by the first optical path 30, traveling in a first direction from a starting position (e.g., at which a first field of view 25, representing one end of slide 90 or sample 95, is under the macro imaging position) to an ending position (e.g., at which a second field of view 25, representing the opposite end of slide 90 or sample 95, is under the macro imaging position). Subsequently, the out-and-back path moves the glass slide 90 under the macro imaging position traveling in a second direction that is opposite the first direction from the ending position back to the starting position. On the "out" portion of the trip, a first macro image is captured using the first transmission-mode illumination system 70 and the first lens 40 along the first optical path 30. On the "back" portion of the trip, a second macro image is captured using the second reflection-mode illumination system 80 and the first lens 40, along the first optical path 30. Alternatively, the second macro image could be captured first on the "out" portion of the trip, and the first macro image could be captured second on the "back" portion of the trip. In another alternative embodiment, the first and second macro images may be captured while the stage remains stationary (i.e., without movement of the stage relative to the first lens 40), for example, by an area scan camera. In any case, while, in the interest of simplicity, the first macro image will be generally described herein as being captured first and the second macro image will be generally described herein as being captured second, it should be understood that the order of image capture may be reversed, such that first macro image is captured second and the second macro image is captured first.

Advantageously, the second illumination system 70 provides oblique illumination from the top of the glass slide 90 and uses an angled scatter light to highlight only the unwanted debris on top of the glass slide 90 and/or coverslip. The positioning of the second illumination system 70 and the direction of its scatter light are carefully configured to minimize undesired reflected light from traveling into the first optical path 30. Additionally, the positioning of the high-resolution camera 20 within the first optical path 30 is carefully configured to minimize or eliminate undesired reflected light in the optical path 30 from reaching a sensor of the high-resolution camera 20.

Advantageously, the digital slide scanning apparatus 10 is configured to provide very high image quality that can be used to identify the area of the glass slide 90 that is occupied by the specimen 95. Because light from the second illumination system 80 may reflect off of the elements of the first illumination system 70 and/or the diffusers 75, the first illumination system 70, diffusers 75, second illumination system 80, and the high-resolution camera 20 are carefully aligned to avoid the individual sensors of the high-resolution camera 20 from receiving any light from the second illumination system 80 that is reflected from the diffusers 75, the first illumination system 70, the glass slide 90, or the sample 95. This results in the individual sensors of the high-resolution camera 20 capturing an image that emphasizes only the debris on the top of the glass slide and/or coverslip when the second illumination system 80 is used.

A processor 555 in the digital slide scanning apparatus 10 processes the two high-resolution macro images captured during the "out" and "back" portions of the trip under the first optical path 30. Unwanted image artifacts corresponding to debris are identified in the macro image captured using the second illumination system 80, and the identified unwanted image artifacts are corrected in the macro image captured using the first illumination system 70. The result is a clean high-resolution macro image that is free from unwanted image artifacts and that can be subsequently used for tissue finding and initial focus point selection.

Figure 1B:
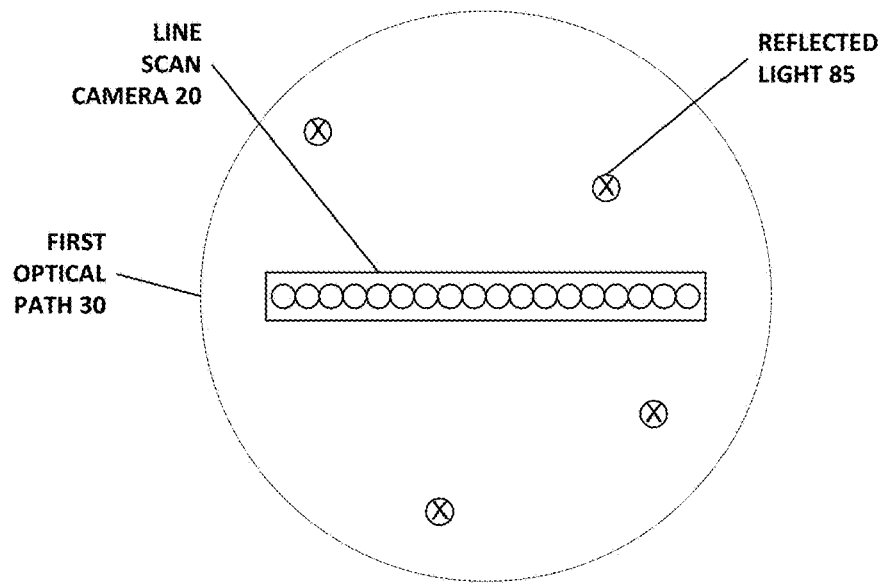
FIG. 1B is a block diagram illustrating an example optical path and line scan camera, according to an embodiment.

FIG. 1B is a block diagram illustrating an example first optical path 30 and high-resolution camera sensor 20, according to an embodiment. As previously discussed, the elements of the digital slide scanning apparatus 10 are carefully aligned such that the individual sensors of the high-resolution camera 20 are positioned in the first optical path 30, such that the individual sensors do not receive undesired reflected light 85 from the second illumination system 80.

Figure 2A:
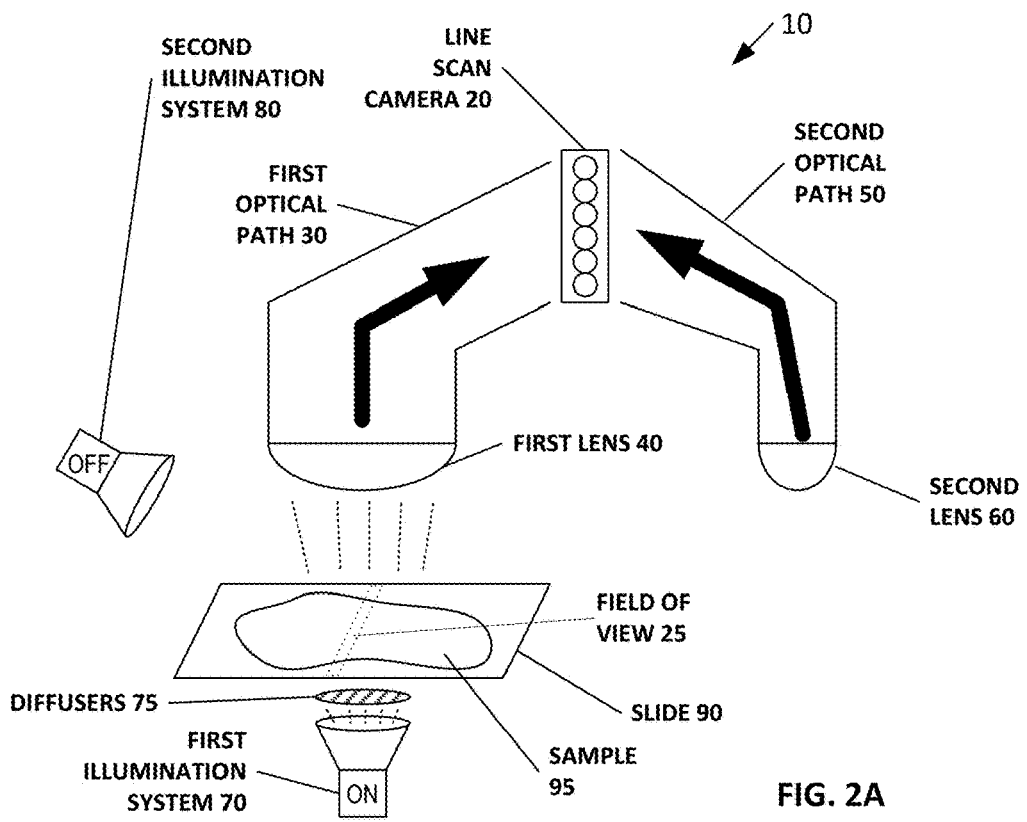
FIG. 2A is a block diagram illustrating an example digital slide scanning system for identifying a tissue area of a glass slide with a first illumination system turned on, according to an embodiment.

FIG. 2A is a block diagram illustrating an example digital slide scanning system 10 for identifying a tissue area 95 of a glass slide 90 with a first illumination system 70 turned on, according to an embodiment. In the illustrated embodiment, the first illumination system 70 is turned on, and light produced by the first illumination system 70 passes through one or more diffusers 75 that are configured to uniformly illuminate the slide 90 and the first optical path 30. The line scan camera 20 is logically aligned such that its field of view 25 is positioned on a portion of the slide 90 that is uniformly lit by the first illumination system 70.

Figure 2B:
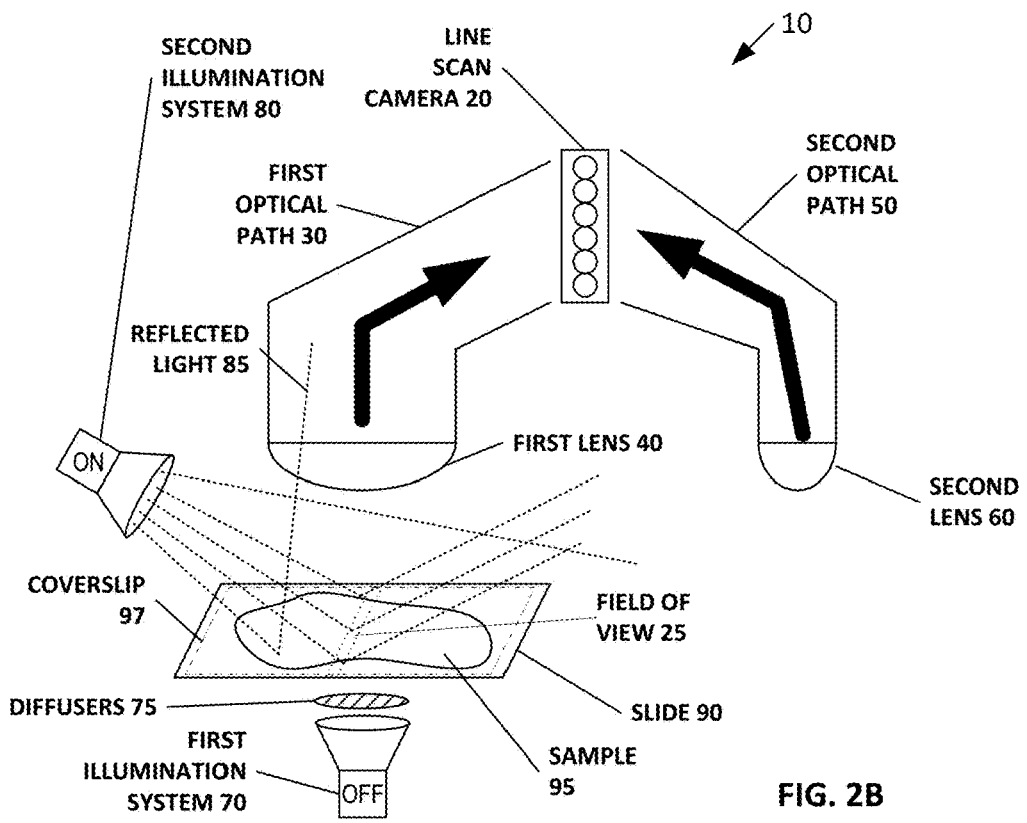
FIG. 2B is a block diagram illustrating an example digital slide scanning system for identifying a tissue area of a glass slide with a second illumination system turned on, according to an embodiment.

FIG. 2B is a block diagram illustrating an example digital slide scanning system 10 for identifying a tissue area 95 of a glass slide 90 with a second illumination system 80 turned on, according to an embodiment. In the illustrated embodiment, the second illumination system 80 is turned on, and light produced by the second illumination system 80 illuminates the slide 90, the sample 95, and the coverslip 97. The second illumination system 80 is positioned such that light from the second illumination system 80 reflects off of the slide 90, the sample 95, the coverslip 97, the diffusers 75, the first illumination system 70, and any other objects within its illumination field, and the reflected light does not pass into the first optical path 30. However, some undesired reflected light 85 may pass into the first optical path 30. The line scan camera 20 is aligned such that the undesired reflected light 85 that does pass into the first optical path 30 is not received by any of the individual sensors of the line scan camera 20.

Figure 3:
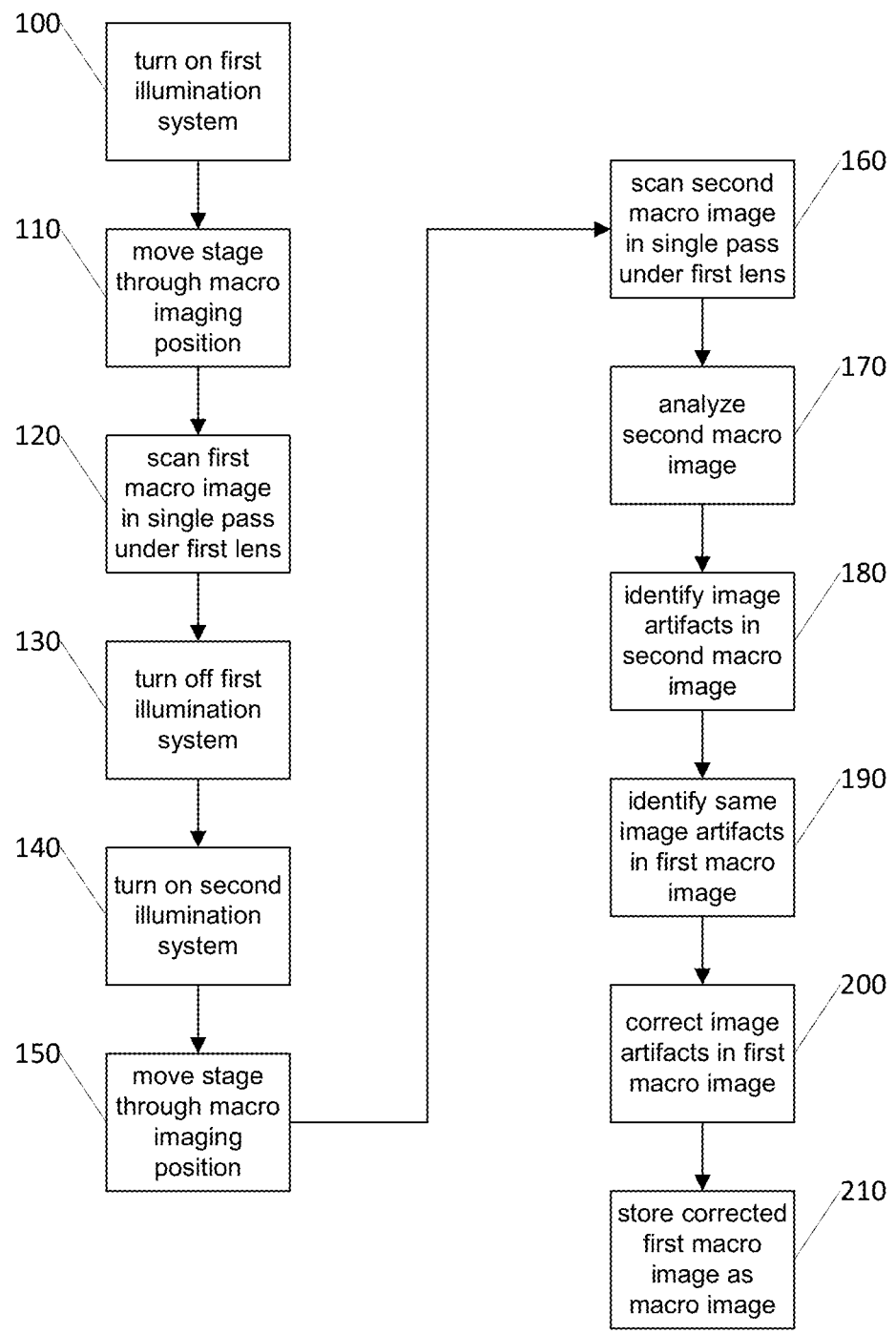
FIG. 3 is a flow diagram illustrating an example process for scanning a macro image of a glass slide in a digital slide scanning apparatus, according to an embodiment.

FIG. 3 is a flow diagram illustrating an example process for scanning a macro image of a glass slide in a digital slide scanning apparatus, according to an embodiment. In the illustrated embodiment, the process may be carried out by a system such as those described with respect to FIGS. 1A-2B and 5A-5D. Initially, in step 100, the system turns on the first illumination system 70 for illuminating a slide from below. This is transmission-mode illumination.

Next, in step 110, the stage that supports the glass slide 90 with the specimen is moved through the macro imaging position. The macro imaging position is defined by the field of view 25 of the high-resolution camera 20 that is positioned in the first optical path 30 that is created by the combination of the macro imaging lens 40 and the high-resolution camera 20. As the stage moves the slide 90 through the macro imaging position, a first macro image of the entire slide 90 is captured during a single pass, as shown in step 120. Advantageously, the field of view 25 of the high-resolution camera 20 is wide enough to capture substantially the entire width of the slide 90.

In an alternative embodiment, the first macro image of the entire slide 90 may be captured while the stage remains stationary with respect to the objective lens, for example, by an area scan camera. For example, the first macro image may be captured as a series of mosaic tiles, with each tile being captured while the stage remains stationary. Alternatively, the first macro image may be captured as a single image that is captured while the stage remains stationary. An area scan camera may also capture the first macro image (as a single image or a series of mosaic tiles) while the stage is in motion, for example, using strobing illumination.

Next, in step 130, the first illumination system 70 is turned off, and then, in step 140, the second illumination system 80 is turned on. The second illumination system 80 illuminates the slide 90 at an angle from above. This is reflection-mode illumination. Next, in step 150, the stage moves the glass slide 90 through the macro imaging position a second time, and, in step 160, a second macro image of the entire slide 90 is captured during a single pass. Again, in an alternative embodiment, the second macro image of the entire slide 90 may be captured while the stage remains stationary, for example, by an area scan camera.

The second macro image of the entire slide 90, captured using reflection mode illumination, is then analyzed in step 170, and, in step 180, unwanted image artifacts corresponding to debris are identified in the second macro image. Next, in step 190, the same unwanted image artifacts that were identified in the second macro image are identified in the first macro image. The first macro image is then corrected, in step 200, to remove or otherwise account for the unwanted image artifacts that are present in the first macro image. Finally, in step 210, the corrected first macro image is stored as the clean macro image for the glass slide 90. Advantageously, the corrected first macro image can be subsequently used to identify the area of the glass slide 90 that is occupied by the sample 95.

While FIG. 3 illustrates the acquisition of the first macro image before the second macro image, it should be understood that the second macro image can be acquired before the first macro image. For example, steps 100-120 may be switched with steps 140-160, and step 130 may comprise turning off the second illumination system 80, instead of the first illumination system 70. In addition, it should be understood that steps 170 and 180 could be performed at any time after the acquisition of the second macro image in step 160, and therefore, do not necessarily need to occur after acquisition of the first macro image in step 120.

FIG. 4A is a flow diagram illustrating an example process for determining a scan area for a glass slide having a sample thereon, according to an embodiment. FIG. 4B is a block diagram illustrating an example set of images used to determine a scan area for a glass slide having a sample thereon, according to an embodiment. FIGS. 4A and 4B will be described together below. In the illustrated embodiments, the process of FIG. 4A may be carried out by a system such as those described with respect to FIGS. 1A-2B and 5A-5D.

Pre-Processing of Images

Initially, the first macro image 300 (the "bottom-lit image" in FIG. 4A, corresponding to example image 400 in FIG. 4B) is obtained (e.g., acquired via steps 100-120 in FIG. 3), and the second macro image 310 (the "top-lit image" in FIG. 4A) is obtained (e.g., acquired via steps 140-160 in FIG. 3). The first macro image 300 may be pre-processed for illumination correction, background offset, and/or background noise removal to generate a pre-processed first macro image 320 (corresponding to example image 420 in FIG. 4A). Advantageously, illumination-correction processing corrects for non-uniformity in illumination, and the background-offset processing reduces the background level to zero. The background noise is estimated by calculating the standard deviation of the negative pixels after the background-offset processing is completed. When the first macro image 300 is pre-processed, a predetermined image of an empty stage with no slide may be used as an illumination profile for macro images captured using the first illumination system 70.

Similarly, the second macro image 310 is pre-processed for background offset to generate a pre-processed second macro image 330. The pre-processed second macro image 330 is then further processed to identify noise in the image. The noise in the pre-processed second macro image 330 corresponds to unwanted image artifacts resulting from debris. In an embodiment, the pre-processed second macro image 330 is de-noised to highlight unwanted image artifacts and canny edge detection is used to identify object edges of the unwanted image artifacts, suppressing small peaks usually from noise, and connecting broken edges and/or lines. Accordingly, an artifacts mask 340 of unwanted image artifacts is generated from the pre-processed second macro image 330. The artifacts mask 340 may be created by assigning artifacts a value of 1 and others a value of 0. An image of an example artifacts mask 340 is illustrated in image 440 in FIG. 4B. In an embodiment, the image 440 is reconstructed by the edge image and the pre-processed macro image 330. In an embodiment, the artifact mask 340 is delated, to account for pixel shifts between the first and second macro images.

Artifact Removal from the Bottom-Illuminated Image

Once the pre-processed first macro image 320 and the artifact mask 340 have been generated, these two images are processed to generate a corrected first macro image 350 that is free from unwanted image artifacts. In an embodiment, this image processing may be accomplished by multiplying the pre-processed first macro image 320 by (1—the artifact mask 340), to remove the unwanted image artifacts from the pre-processed first macro image 320 and thereby generate the corrected first macro image 350 (corresponding to example image 450 in FIG. 4B).

Tissue Reconstruction

In an embodiment, the process may also separate the pre-processed first macro image 320 into pieces depending on the amount of unwanted image artifacts present. Thus, a tissue reconstruction procedure may also be performed by evaluating the intensity level surrounding the pixels that are identified with unwanted image artifacts. Those pixels are then added back with the surrounding intensity levels to generate a reconstructed corrected first macro image 360 (corresponding to example image 460 in FIG. 4B).

Coverslip and Small Object Removal

Next, in an embodiment, a line detector is used for the coverslip detection, and a morphological operation is used for small object detection. The identified coverslip and small objects are then removed to generate a final first macro image mask 370, where tissue is identified by a value of 1 and non-tissue is identified by a value of 0. Advantageously, the final first macro image mask 370 can be used to identify the area of scanning 380.

In an example embodiment, the intermediate image processing can result in faint macro slide images with unwanted image artifacts. In FIG. 4B, image 400 shows the first macro image 300, and image 420 shows the binary image mask after pre-processing the first macro image 300 for background offset and background noise removal. Similarly, in FIG. 4B, image 440 shows an example of a processed unwanted-image-artifacts mask 340, after the second macro image 310 has been pre-processed for background offset and to de-noise the image data. Advantageously, artifact mask image 440 highlights the unwanted image artifacts and the unwanted slide label. The two masks 420 and 440 are then used for unwanted image artifact detection and removal from the first macro image 300 (also shown as image 400 in FIG. 4B). The two masks 420 and 440 can also be used for tissue reconstruction as shown in image 450, as well as coverslip and small object detection and removal to generate image 460, which is the final tissue mask. In the illustrated example, the identified scanning area 380 is shown as the area within the rectangle in image 460.

Example Scanning System

Figure 5A:
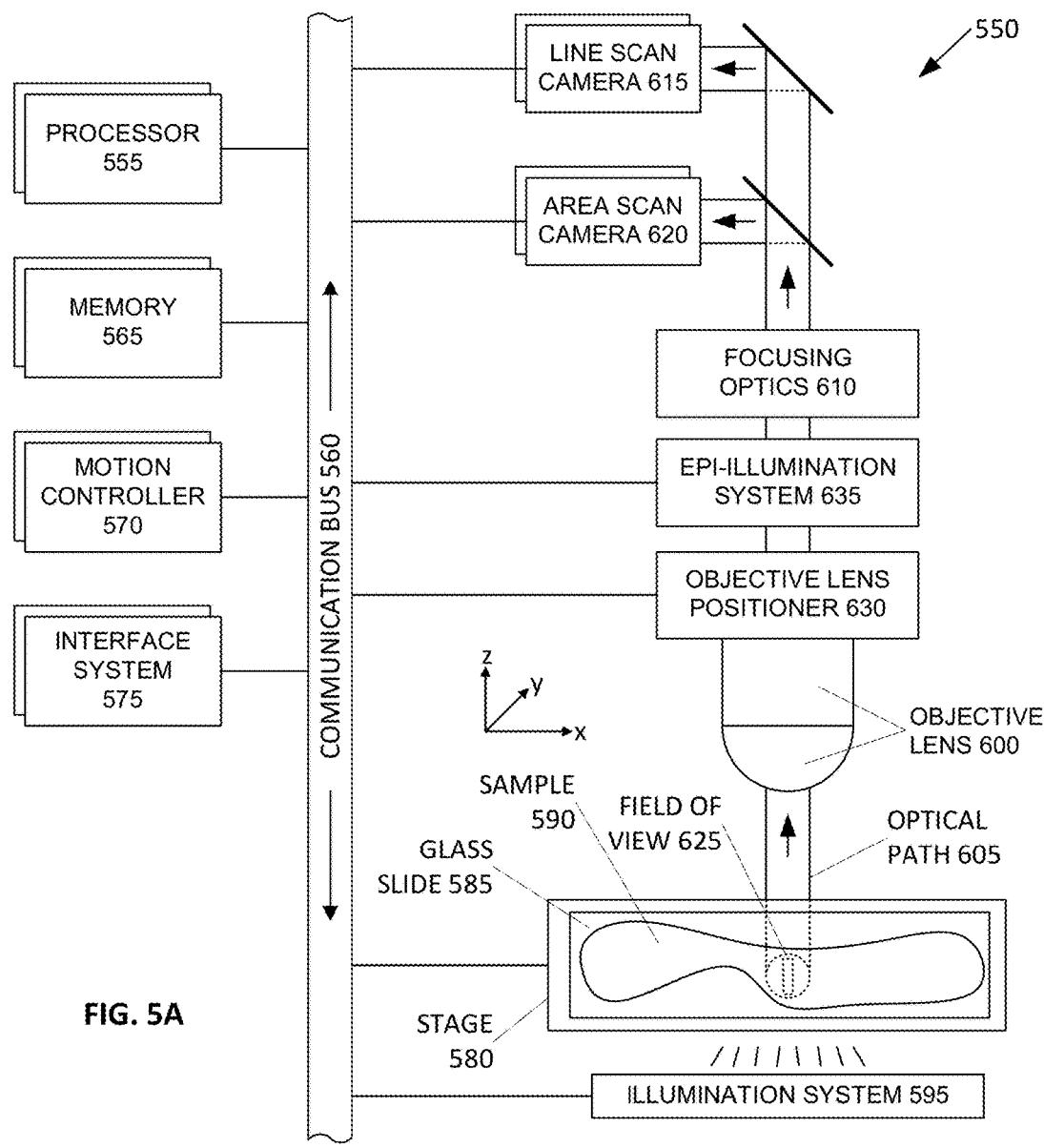
FIG. 5A is a block diagram illustrating an example processor-enabled device that may be used in connection with various embodiments described herein.

FIG. 5A is a block diagram illustrating an example processor-enabled device 550 that may be used in connection with various embodiments described herein. Alternative forms of the device 550 may also be used as will be understood by the skilled artisan. In the illustrated embodiment, the device 550 is presented as a digital imaging device (also referred to herein as a scanner system, scanning system, digital scanning apparatus, digital slide scanning apparatus, etc.) that comprises one or more processors 555, one or more memories 565, one or more motion controllers 570, one or more interface systems 575, one or more movable stages 580 that each support one or more glass slides 585 with one or more samples 590, one or more illumination systems 595 that illuminate the sample, one or more objective lenses 600 that each define an optical path 605 that travels along an optical axis, one or more objective lens positioners 630, one or more optional epi-illumination systems 635 (e.g., included in a fluorescence scanner system), one or more focusing optics 610, one or more line scan cameras 615 (e.g., comprising line scan camera 20) and/or one or more area scan cameras 620, each of which define a separate field of view 625 on the sample 590 and/or glass slide 585. The various elements of the scanner system 550 are communicatively coupled via one or more communication busses 560. Although there may be one or more of each of the various elements of the scanner system 550, for simplicity in the description that follows, these elements will be described in the singular except when needed to be described in the plural to convey the appropriate information.

The one or more processors 555 may include, for example, a central processing unit (CPU) and a separate graphics processing unit (GPU) capable of processing instructions in parallel, or the one or more processors 555 may include a multicore processor capable of processing instructions in parallel. Additional separate processors may also be provided to control particular components or perform particular functions such as image processing. For example, additional processors may include an auxiliary processor to manage data input, an auxiliary processor to perform floating point mathematical operations, a special-purpose processor having an architecture suitable for fast execution of signal-processing algorithms (e.g., digital-signal processor), a slave processor subordinate to the main processor (e.g., back-end processor), an additional processor for controlling the line scan camera 615, the stage 580, the objective lens 225, and/or a display (not shown). Such additional processors may be separate discrete processors or may be integrated with the processor 555.

The memory 565 provides storage of data and instructions for programs that can be executed by the processor 555. The memory 565 may include one or more volatile and/or non-volatile computer-readable storage mediums that store the data and instructions, including, for example, a random access memory, a read only memory, a hard disk drive, a removable storage drive, and/or the like. The processor 555 is configured to execute instructions that are stored in the memory 565 and communicate via communication bus 560 with the various elements of the scanner system 550 to carry out the overall function of the scanner system 550.

The one or more communication busses 560 may include a communication bus 560 that is configured to convey analog electrical signals, and may include a communication bus 560 that is configured to convey digital data. Accordingly, communications from the processor 555, the motion controller 570, and/or the interface system 575, via the one or more communication busses 560, may include both electrical signals and digital data. The processor 555, the motion controller 570, and/or the interface system 575 may also be configured to communicate with one or more of the various elements of the scanning system 550 via a wireless communication link.

The motion control system 570 is configured to precisely control and coordinate X, Y, and/or Z movement of the stage 580 (e.g., within an X-Y plane) and/or the objective lens 600 (e.g., along a Z axis orthogonal to the X-Y plane, via the objective lens positioner 630). The motion control system 570 is also configured to control movement of any other moving part in the scanner system 550. For example, in a fluorescence scanner embodiment, the motion control system 570 is configured to coordinate movement of optical filters and the like in the epi-illumination system 635.

The interface system 575 allows the scanner system 550 to interface with other systems and human operators. For example, the interface system 575 may include a user interface to provide information directly to an operator and/or to allow direct input from an operator. The interface system 575 is also configured to facilitate communication and data transfer between the scanning system 550 and one or more external devices that are directly connected (e.g., a printer, removable storage medium) or external devices such as an image server system, an operator station, a user station, and an administrative server system that are connected to the scanner system 550 via a network (not shown).

The illumination system 595 is configured to illuminate a portion of the sample 590. The illumination system 595 may include, for example, one or more light sources, including the first illumination system 70 and the second illumination system 80, and illumination optics. The light source(s) could comprise a variable intensity halogen light source with a concave reflective mirror to maximize light output and a KG-1 filter to suppress heat. The light source(s) could comprise any type of arc-lamp, laser, or other source of light. In an embodiment, the illumination system 595 illuminates the sample 590 in transmission mode such that the line scan camera 615 and/or area scan camera 620 sense optical energy that is transmitted through the sample 590. Alternatively, or in combination, the illumination system 595 may also be configured to illuminate the sample 590 in reflection mode such that the line scan camera 615 and/or area scan camera 620 sense optical energy that is reflected from the sample 590. The illumination system 595 may be configured to be suitable for interrogation of the microscopic sample 590 in any known mode of optical microscopy.

In an embodiment, the scanner system 550 optionally includes an epi-illumination system 635 to optimize the scanner system 550 for fluorescence scanning. Fluorescence scanning is the scanning of samples 590 that include fluorescence molecules, which are photon-sensitive molecules that can absorb light at a specific wavelength (excitation). These photon-sensitive molecules also emit light at a higher wavelength (emission). Because the efficiency of this photoluminescence phenomenon is very low, the amount of emitted light is often very low. This low amount of emitted light typically frustrates conventional techniques for scanning and digitizing the sample 590 (e.g., transmission-mode microscopy). Advantageously, in an optional fluorescence scanner system embodiment of the scanner system 550, use of a line scan camera 615 that includes multiple linear sensor arrays (e.g., a TDI line scan camera) increases the sensitivity to light of the line scan camera by exposing the same area of the sample 590 to each of the multiple linear sensor arrays of the line scan camera 615. This is particularly useful when scanning faint fluorescence samples with low emitted light.

Accordingly, in a fluorescence scanner system embodiment, the line scan camera 615 is preferably a monochrome TDI line scan camera. Advantageously, monochrome images are ideal in fluorescence microscopy because they provide a more accurate representation of the actual signals from the various channels present on the sample. As will be understood by those skilled in the art, a fluorescence sample 590 can be labeled with multiple florescence dyes that emit light at different wavelengths, which are also referred to as "channels."

Furthermore, because the low and high end signal levels of various fluorescence samples present a wide spectrum of wavelengths for the line scan camera 615 to sense, it is desirable for the low and high end signal levels that the line scan camera 615 can sense to be similarly wide. Accordingly, in a fluorescence scanner embodiment, a line scan camera 615 used in the fluorescence scanning system 550 is a monochrome 10-bit 64-linear-array TDI line scan camera. It should be noted that a variety of bit depths for the line scan camera 615 can be employed for use with a fluorescence scanner embodiment of the scanning system 550.

The movable stage 580 is configured for precise X-Y movement under control of the processor 555 or the motion controller 570. The movable stage may also be configured for Z movement under control of the processor 555 or the motion controller 570. The moveable stage is configured to position the sample in a desired location during image data capture by the line scan camera 615 and/or the area scan camera. The moveable stage is also configured to accelerate the sample 590 in a scanning direction to a substantially constant velocity, and then maintain the substantially constant velocity during image data capture by the line scan camera 615. In an embodiment, the scanner system 550 may employ a high-precision and tightly coordinated X-Y grid to aid in the location of the sample 590 on the movable stage 580. In an embodiment, the movable stage 580 is a linear-motor-based X-Y stage with high-precision encoders employed on both the X and the Y axis. For example, very precise nanometer encoders can be used on the axis in the scanning direction and on the axis that is in the direction perpendicular to the scanning direction and on the same plane as the scanning direction. The stage is also configured to support the glass slide 585 upon which the sample 590 is disposed.

The sample 590 (e.g., corresponding to sample 95) can be anything that may be interrogated by optical microscopy. For example, a glass microscope slide 585 (e.g., corresponding to slide 90) is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 590 may also be an array of any type of DNA or DNA-related material such as cDNA or RNA or protein that is deposited on any type of slide or other substrate, including any and all samples commonly known as a microarrays. The sample 590 may be a microtiter plate (e.g., a 96-well plate). Other examples of the sample 590 include integrated circuit boards, electrophoresis records, petri dishes, film, semiconductor materials, forensic materials, or machined parts.

Objective lens 600 is mounted on the objective positioner 630, which, in an embodiment, employs a very precise linear motor to move the objective lens 600 along the optical axis defined by the objective lens 600. For example, the linear motor of the objective lens positioner 630 may include a 50 nanometer encoder. The relative positions of the stage 580 and the objective lens 600 in X, Y, and/or Z axes are coordinated and controlled in a closed-loop manner using motion controller 570 under the control of the processor 555 that employs memory 565 for storing information and instructions, including the computer-executable programmed steps for overall scanning system 550 operation.

In an embodiment, the objective lens 600 is a plan apochromatic ("APO") infinity corrected objective with a numerical aperture corresponding to the highest spatial resolution desirable, where the objective lens 600 is suitable for transmission-mode illumination microscopy, reflection-mode illumination microscopy, and/or epi-illumination-mode fluorescence microscopy (e.g., an Olympus 40×, 0.75NA or 20×, 0.75 NA). Advantageously, objective lens 600 is capable of correcting for chromatic and spherical aberrations. Because objective lens 600 is infinity corrected, focusing optics 610 can be placed in the optical path 605 above the objective lens 600 where the light beam passing through the objective lens 600 becomes a collimated light beam. The focusing optics 610 focus the optical signal captured by the objective lens 600 onto the light-responsive elements of the line scan camera 615 and/or the area scan camera 620 and may include optical components such as filters, magnification changer lenses, and/or the like. The objective lens 600, combined with the focusing optics 610, provides the total magnification for the scanning system 550. In an embodiment, the focusing optics 610 may contain a tube lens and an optional 2× magnification changer. Advantageously, the 2× magnification changer allows a native 20× objective lens 600 to scan the sample 590 at 40× magnification.

The line scan camera 615 comprises at least one linear array of picture elements ("pixels"). The line scan camera may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, 3 linear array ("red-green-blue" or "RGB") color line scan camera or a 96 linear array monochrome TDI may also be used. TDI line scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line scan cameras comprise multiple linear arrays. For example, TDI line scan cameras are available with 24, 32, 48, 64, 96, or even more linear arrays. The scanner system 550 also supports linear arrays that are manufactured in a variety of formats including some with 512 pixels, some with 1024 pixels, and others having as many as 4096 pixels. Similarly, linear arrays with a variety of pixel sizes can also be used in the scanner system 550. The salient requirement for the selection of any type of line scan camera 615 is that the motion of the stage 580 can be synchronized with the line rate of the line scan camera 615, so that the stage 580 can be in motion with respect to the line scan camera 615 during the digital image capture of the sample 590.

The image data generated by the line scan camera 615 is stored in a portion of the memory 565 and processed by the processor 555 to generate a contiguous digital image of at least a portion of the sample 590. The contiguous digital image can be further processed by the processor 555 and the revised contiguous digital image can also be stored in the memory 565.

In an embodiment with two or more line scan cameras 615, at least one of the line scan cameras 615 can be configured to function as a focusing sensor that operates in combination with at least one of the other line scan cameras 615 that is configured to function as an imaging sensor. The focusing sensor can be logically positioned on the same optical axis as the imaging sensor or the focusing sensor may be logically positioned before or after the imaging sensor with respect to the scanning direction of the scanner system 550. In such an embodiment with at least one line scan camera 615 functioning as a focusing sensor, the image data generated by the focusing sensor is stored in a portion of the memory 565 and processed by the one or more processors 555 to generate focus information, to allow the scanner system 550 to adjust the relative distance between the sample 590 and the objective lens 600 to maintain focus on the sample during scanning. Additionally, in an embodiment, the at least one line scan camera 615 functioning as a focusing sensor may be oriented such that each of a plurality of individual pixels of the focusing sensor is positioned at a different logical height along the optical path 605.

In operation, the various components of the scanner system 550 and the programmed modules stored in memory 565 enable automatic scanning and digitizing of the sample 590, which is disposed on a glass slide 585. The glass slide 585 is securely placed on the movable stage 580 of the scanner system 550 for scanning the sample 590. Under control of the processor 555, the movable stage 580 accelerates the sample 590 to a substantially constant velocity for sensing by the line scan camera 615, where the speed of the stage is synchronized with the line rate of the line scan camera 615. After scanning a stripe of image data, the movable stage 580 decelerates and brings the sample 590 to a substantially complete stop. The movable stage 580 then moves orthogonal to the scanning direction to position the sample 590 for scanning of a subsequent stripe of image data (e.g., an adjacent stripe). Additional stripes are subsequently scanned until an entire portion of the sample 590 or the entire sample 590 is scanned.

For example, during digital scanning of the sample 590, a contiguous digital image of the sample 590 is acquired as a plurality of contiguous fields of view that are combined together to form an image stripe. A plurality of adjacent image stripes are similarly combined together to form a contiguous digital image of a portion or the entire sample 590. The scanning of the sample 590 may include acquiring vertical image stripes or horizontal image stripes. The scanning of the sample 590 may be either top-to-bottom, bottom-to-top, or both (bi-directional), and may start at any point on the sample. Alternatively, the scanning of the sample 590 may be either left-to-right, right-to-left, or both (bi-directional), and may start at any point on the sample. Additionally, it is not necessary that image stripes be acquired in an adjacent or contiguous manner. Furthermore, the resulting image of the sample 590 may be an image of the entire sample 590 or only a portion of the sample 590.

In an embodiment, computer-executable instructions (e.g., programmed modules and software) are stored in the memory 565 and, when executed, enable the scanning system 550 to perform the various functions described herein. In this description, the term "computer-readable storage medium" is used to refer to any media used to store and provide computer-executable instructions to the scanning system 550 for execution by the processor 555. Examples of these media include memory 565 and any removable or external storage medium (not shown) communicatively coupled with the scanning system 550 either directly or indirectly, for example via a network (not shown).

Figure 5B:
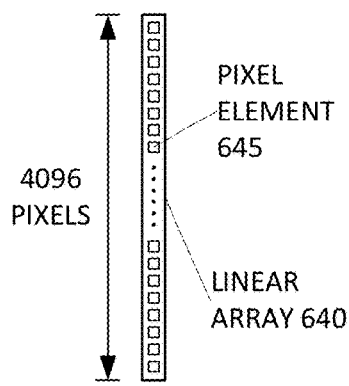
FIG. 5B is a block diagram illustrating an example line scan camera having a single linear array, according to an embodiment.

FIG. 5B illustrates a line scan camera having a single linear array 640, which may be implemented as a charge coupled device ("CCD") array. The single linear array 640 comprises a plurality of individual pixels 645. In the illustrated embodiment, the single linear array 640 has 4096 pixels. In alternative embodiments, linear array 640 may have more or fewer pixels. For example, common formats of linear arrays include 512, 1024, and 4096 pixels. The pixels 645 are arranged in a linear fashion to define a field of view 625 (e.g., corresponding to the field of view 25) for the linear array 640. The size of the field of view 625 varies in accordance with the magnification of the scanner system 550.

Figure 5C:
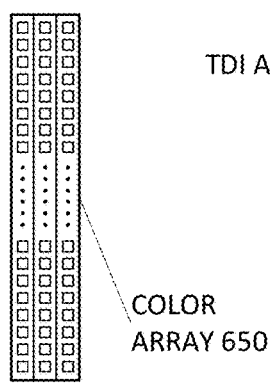
FIG. 5C is a block diagram illustrating an example line scan camera having three linear arrays, according to an embodiment.

FIG. 5C illustrates a line scan camera having three linear arrays, each of which may be implemented as a CCD array. The three linear arrays combine to form a color array 650. In an embodiment, each individual linear array in the color array 650 detects a different color intensity, for example, red, green, or blue. The color image data from each individual linear array in the color array 650 is combined to form a single field of view 625 of color image data.

Figure 5D:
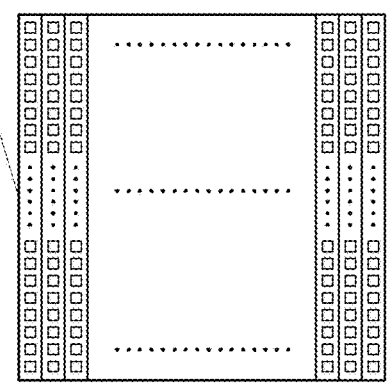
FIG. 5D is a block diagram illustrating an example line scan camera having a plurality of linear arrays, according to an embodiment.

FIG. 5D illustrates a line scan camera having a plurality of linear arrays, each of which may be implemented as a CCD array. The plurality of linear arrays combine to form a TDI array 655. Advantageously, a TDI line scan camera may provide a substantially better SNR in its output signal by summing intensity data from previously imaged regions of a specimen, yielding an increase in the SNR that is in proportion to the square-root of the number of linear arrays (also referred to as integration stages). A TDI line scan camera may comprise a larger variety of numbers of linear arrays. For example, common formats of TDI line scan cameras include 24, 32, 48, 64, 96, 120, and even more linear arrays.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A digital slide scanning apparatus comprising:
   a stage configured to support a glass slide;
   a high-resolution camera;
   a first lens defining a macro image optical path to the high-resolution camera, wherein the first lens is configured to provide a field of view to the high-resolution camera, and wherein the field of view has a width that is substantially equal to a complete width of a glass slide;
   a first illumination system optically coupled with the first lens and configured for transmission-mode illumination of the field of view from below a glass slide on the stage;
   a second illumination system optically coupled with the first lens and configured for reflection-mode illumination of the field of view from above a glass slide on the stage, wherein the second illumination system is configured to angle illumination light in a pattern such that substantially none of its illumination light is reflected along the optical path to the high-resolution camera; and
   at least one processor configured to, while a stage is supporting a glass slide,
      while the field of view is illuminated by the first illumination system, capture a first macro image of a specimen on the glass slide using the high-resolution camera while the glass slide is under the first lens,
      while the field of view is illuminated by the second illumination system, capture a second macro image of the specimen on the glass slide using the high-resolution camera while the glass slide is under the first lens,
      identify image artifacts in the second macro image, and,
      based on the identified image artifacts in the second macro image, correct the first macro image to generate a modified first macro image.

2. The digital slide scanning apparatus of claim 1, wherein the at least one processor is further configured to use the modified first macro image to find tissue in the specimen and select an initial focus point for scanning the specimen.

3. The digital slide scanning apparatus of claim 1, wherein the first illumination system further comprises a diffuser.

4. The digital slide scanning apparatus of claim 1, wherein the first macro image is captured before the second macro image.

5. The digital slide scanning apparatus of claim 1, wherein the first macro image is captured after the second macro image.

6. The digital slide scanning apparatus of claim 1, further comprising a second lens for capturing high-resolution images at high magnification, wherein the second lens defines another optical path to the high-resolution image that is different than the macro image optical path, and wherein the second lens is configured to provide a smaller field of view than the first lens with a width that is less than a complete width of a glass slide.

7. The digital slide scanning apparatus of claim 1, wherein identifying image artifacts in the second macro image comprises generating an artifact mask from the second macro image.

8. The digital slide scanning apparatus of claim 7, wherein correcting the first macro image comprises applying the artifact mask to the first macro image.

9. The digital slide scanning apparatus of claim 8, wherein correcting the first macro image comprises, prior to applying the artifact mask to the first macro image, pre-processing the first macro image to apply one or more of illumination correction, background offsetting, or background noise removal to the first macro image.

10. The digital slide scanning apparatus of claim 7, wherein identifying artifacts in the second macro image comprises, prior to generating the artifact mask, pre-processing the second macro image to apply background offsetting to the second macro image.

11. The digital slide scanning apparatus of claim 1, wherein the at least one processor is further configured to, based on the modified first macro image, determine an area of the specimen to scan.

12. The digital slide scanning apparatus of claim 1, wherein correcting the first macro image comprises altering intensity levels in pixels, representing artifacts, in the first macro image, according to intensity levels in pixels surrounding those pixels that represent artifacts.

13. The digital slide scanning apparatus of claim 1,
wherein capturing the first macro image comprises moving the stage in a first direction to capture the first macro image of the specimen on the glass slide using the high-resolution camera during a single pass of the glass slide under the first lens, and
wherein capturing the second macro image comprises moving the stage in a second direction to capture the second macro image of the specimen on the glass slide using the high-resolution camera during a single pass of the glass slide under the first lens.

14. The digital slide scanning apparatus of claim 13, wherein the second direction is opposite the first direction.

15. A method for generating a macro image in a digital slide scanning apparatus that comprises a stage configured to support a glass slide, a high-resolution camera, a lens defining a macro image optical path to the high-resolution camera and configured to provide a field of view to the high-resolution camera that has a width that is substantially equal to a complete width of a glass slide, a first illumination system optically coupled with the first lens and configured for transmission-mode illumination of the field of view from below a glass slide on the stage, a second illumination system optically coupled with the first lens and configured for reflection-mode illumination of the field of view from above a glass slide on the stage, and at least one processor, the method comprising, by the at least one processor of the digital slide scanning apparatus:
while the field of view is illuminated by the first illumination system, capturing a first macro image of a specimen on the glass slide using the high-resolution camera while the glass slide is under the first lens;
while the field of view is illuminated by the second illumination system, capturing a second macro image of the specimen on the glass slide using the high-resolution camera while the glass slide is under the first lens;
identifying image artifacts in the second macro image; and,
based on the identified image artifacts in the second macro image, correcting the first macro image to generate a modified first macro image.

* * * * *